(12) United States Patent
Deng et al.

(10) Patent No.: US 11,250,837 B2
(45) Date of Patent: Feb. 15, 2022

(54) SPEECH SYNTHESIS SYSTEM, METHOD AND NON-TRANSITORY COMPUTER READABLE MEDIUM WITH LANGUAGE OPTION SELECTION AND ACOUSTIC MODELS

(71) Applicant: INSTITUTE FOR INFORMATION INDUSTRY, Taipei (TW)

(72) Inventors: Guang-Feng Deng, Taipei (TW); Cheng-Hung Tsai, Taipei (TW); Han-Wen Liu, Taipei (TW); Chih-Chung Chien, Taipei (TW); Chuan-Wen Chen, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 172 days.

(21) Appl. No.: 16/699,717

(22) Filed: Dec. 1, 2019

(65) Prior Publication Data

US 2021/0142784 A1 May 13, 2021

(30) Foreign Application Priority Data

Nov. 11, 2019 (TW) ................................ 108140863

(51) Int. Cl.
| | | |
|---|---|---|
| *G10L 13/00* | (2006.01) | |
| *G10L 13/08* | (2013.01) | |
| *G10L 25/18* | (2013.01) | |
| *G10L 15/187* | (2013.01) | |
| *G10L 15/02* | (2006.01) | |

(Continued)

(52) U.S. Cl.
CPC ............ *G10L 13/086* (2013.01); *G06F 40/58* (2020.01); *G10L 13/00* (2013.01); *G10L 13/047* (2013.01); *G10L 15/02* (2013.01); *G10L 15/187* (2013.01); *G10L 15/1815* (2013.01); *G10L 15/22* (2013.01); *G10L 25/18* (2013.01); *G10L 2015/025* (2013.01)

(58) Field of Classification Search
CPC .................................................... G06F 16/3337
USPC ......................................................... 704/2–8
See application file for complete search history.

(56) References Cited

U.S. PATENT DOCUMENTS

| | | | |
|---|---|---|---|
| 7,496,498 B2 | 2/2009 | Chu et al. | |
| 7,539,619 B1 * | 5/2009 | Seligman ................ | G10L 15/30 704/277 |

(Continued)

FOREIGN PATENT DOCUMENTS

CN 108766414 A 11/2018

OTHER PUBLICATIONS

The office action of the corresponding Taiwanese application dated Jun. 29, 2020.

*Primary Examiner* — Jesse S Pullias
(74) *Attorney, Agent, or Firm* — CKC & Partners Co., LLC

(57) ABSTRACT

A speech synthesis system includes an operating interface, a storage unit and a processor. The operating interface provides a plurality of language options for a user to select one output language option therefrom. The storage unit stores a plurality of acoustic models. Each acoustic model corresponds to one of the language options and includes a plurality of phoneme labels corresponding to a specific vocal. The processor receives a text file and generates output speech data corresponding to the specific vocal according to the text file, a speech synthesizer, and one of the acoustic models which corresponds to the output language option.

17 Claims, 2 Drawing Sheets

(51) Int. Cl.
*G06F 40/58* (2020.01)
*G10L 13/047* (2013.01)
*G10L 15/22* (2006.01)
*G10L 15/18* (2013.01)

(56) References Cited

U.S. PATENT DOCUMENTS

| | | | |
|---|---|---|---|
| 7,596,499 | B2 | 9/2009 | Anguera Miro et al. |
| 8,244,534 | B2 | 8/2012 | Qian et al. |
| 8,290,775 | B2 | 10/2012 | Etezadi et al. |
| 8,898,066 | B2 | 11/2014 | Li et al. |
| 2007/0016401 | A1* | 1/2007 | Ehsani .................. G10L 15/005 704/9 |
| 2008/0004858 | A1* | 1/2008 | Gao ........................ G06F 40/58 704/2 |
| 2008/0059147 | A1* | 3/2008 | Afify ...................... G06Q 30/02 704/5 |
| 2008/0133245 | A1* | 6/2008 | Proulx .................... G06F 40/55 704/277 |
| 2009/0055162 | A1* | 2/2009 | Qian ....................... G10L 13/06 704/8 |
| 2015/0073770 | A1 | 3/2015 | Pulz et al. |
| 2021/0209315 | A1* | 7/2021 | Jia .......................... G06F 40/47 |

\* cited by examiner

SPEECH SYNTHESIS SYSTEM, METHOD AND NON-TRANSITORY COMPUTER READABLE MEDIUM WITH LANGUAGE OPTION SELECTION AND ACOUSTIC MODELS

CROSS-REFERENCE TO RELATED APPLICATION

The present application claims priority to Taiwan Application Serial Number 108140863, filed Nov. 11, 2019, which is incorporated herein by reference in its entirety.

BACKGROUND

Field of Invention

The present disclosure relates to an electronic system, an operating method, and a non-transitory computer readable medium. More particularly, the present disclosure relates to a system, a method, and a non-transitory computer readable medium of converting and/or synthesizing a specific vocal.

Description of Related Art

Under the trend of globalization, cultural communication and audio and video entertainment system need to be adapted to multilingualism environment. For example, service robots, story-telling devices, virtual characters in audio and video media, or characters of voice dubbing in movies/multi-media video, may all need voices in different languages such as Chinese, English, Japanese, etc., and sometimes need a voice mixed by several languages, such as the speech mixed by Chinese and English. These service robots, story-telling devices, virtual characters, etc., need a text to speech (TTS) engine of multiple languages to synthesize the speech.

However, most voice actors or voice dubbers can only dub in a single language or record a corpus of a single language, to generate a text to speech engine of texts in various kinds of languages, to synthesize the speech. Voice actors who are able to dub record the corpus in multiple languages are rare, which make it difficult to produce or customize products that require a specific voice to be spoken in multiple languages.

SUMMARY

In order to solve the foregoing problems, one aspect of the present disclosure is related to a speech synthesis system which includes an operating interface, a storage unit, and a processor. The operating interface provides a plurality of language options for a user to select one output language option therefrom as an output language option. The storage unit stores a plurality of acoustic models, wherein each of the acoustic models corresponds to one of the language options and includes a plurality of phoneme labels corresponding to a specific vocal. The processor is communicatively coupled to the operating interface and the storage unit, wherein the processor is configured to receive a text file and to generate output speech data corresponding to the specific vocal according to the text file, a speech synthesizer, and one of the acoustic model associated with the output language.

Another aspect of the present disclosure is related to a speech synthesis method which includes: receiving an output language option selected from a plurality of language options by a user; accessing a plurality of acoustic models from a storage unit, wherein each acoustic model corresponds to one of the language options respectively and comprises a plurality of phoneme labels corresponding to a specific vocal; receiving a text file; and generating output speech data corresponding to the specific vocal according to the text file, a speech synthesizer, and one of the acoustic models associated with the output language.

Another aspect of the present disclosure is related to a non-transitory computer readable medium includes at least a computer executable instruction which, when executed by a processor, causes the processor to: receive an output language option selected from a plurality of language options by a user; access a plurality of acoustic models from a storage unit, wherein each acoustic model corresponds to one of the language options respectively and comprises a plurality of phoneme labels corresponding to a specific vocal; receive a text file; and generate output speech data corresponding to the specific vocal according to the text file, a speech synthesizer, and one of the acoustic model associated with the output language.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
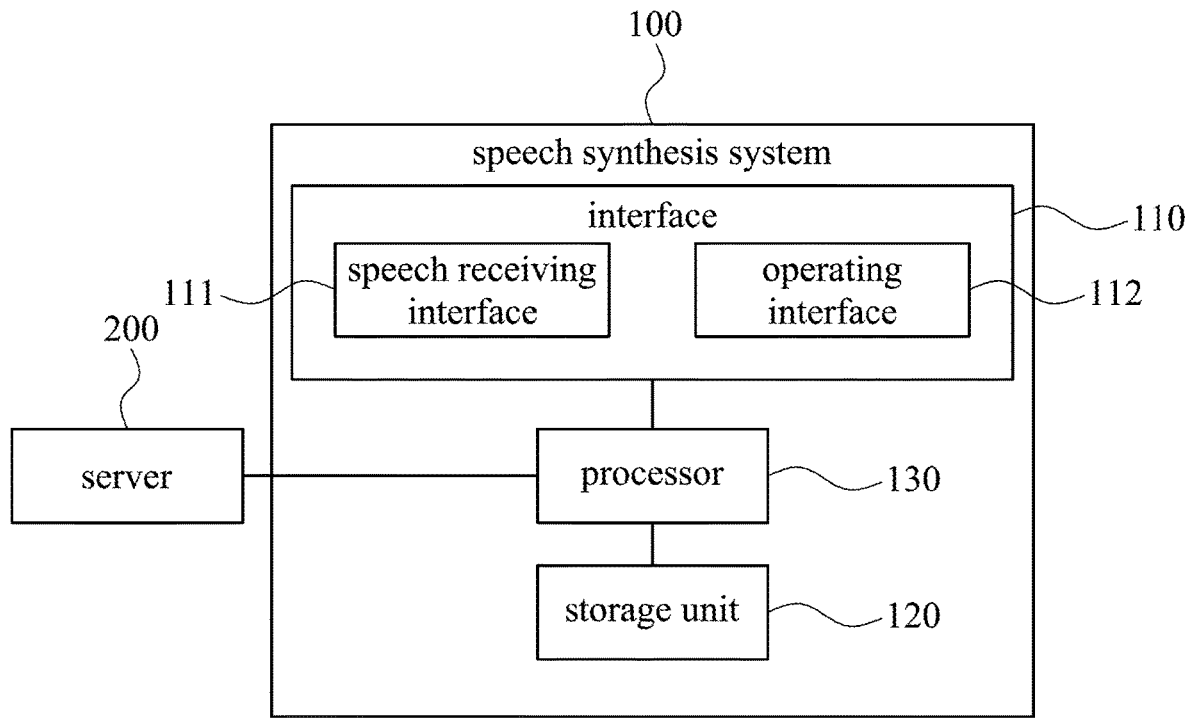
FIG. 1 is a schematic diagram illustrating a speech synthesis system, in accordance with some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

The terms herein are used for describing particular embodiments and are not intended to be limited thereto. Single forms such as "a", "this", "the", as used herein also include the plurality form.

In the description herein and throughout the claims that follow, the terms "coupled" or "connected" in this document may be used to indicate that two or more elements physically or electrically contact with each other, directly or indirectly. They may also be used to indicate that two or more elements cooperate or interact with each other.

In the description herein and throughout the claims that follow, the terms "comprise" or "comprising," "include" or "including," "have" or "having," "contain" or "containing" and the like used herein are to be understood to be open-ended, i.e., to mean including but not limited to.

In the description herein and throughout the claims that follow, the phrase "and/or" includes any and all combinations of one or more of the associated listed claims.

In the description herein and throughout the claims that follow, unless otherwise defined, all terms have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic diagram of a speech synthesis system 100, in accordance with some embodiments of the present disclosure. As shown in FIG. 1, in some embodiments, the speech synthesis system 100 may include an interface 110, a storage unit 120, and a processor 130.

In some embodiments, the interface 110 may include, but not limited to, an interface implementing human-computer interaction by video devices or audio devices, and the interface 110 may include an operating interface 112 and a speech receiving interface 111. For example, the operating interface 112 can be implemented through a display by displaying visual graphics or continuous image output data, and is provided for the user to input data by touch or other ways. For example, the speech receiving interface 111 can be provided for the user to input data by recording, and can output data by playing voice, which are implemented by a microphone and a speaker. In some embodiments, the speech receiving interface 111 can also receive an image file, and the image file can include speech data and/or subtitle data corresponding to several types of selectable languages.

In some embodiments, the storage unit 120 may include, but not limited to, flash memory, hard disk drive (HDD), solid state drive (SSD), dynamic random access memory (DRAM), or static random access memory (SRAM). In some embodiments, the storage unit 120 is configured as a type of non-transitory computer readable medium, and stores at least a computer executable instruction, in which the computer executable instruction is associated with a speech synthesis method.

In some embodiments, the processor 130 may include, but not limited to, a single processor and integration of a number of microprocessors, for example, central processing unit (CPU) or graphic processing unit, etc. The processors (micro-processors) are coupled to a memory, and accordingly, the processor 130 can access the computer accessible instruction from the storage unit 120, and execute a specific application process according to the computer executable instruction to implement the speech synthesis method described above. For a better understanding of the speech synthesis method, detail steps of the speech synthesis method will be described in the following paragraphs.

As shown in FIG. 1, in some embodiments, the processor 130 can be communicatively coupled to the server 200 selectively. In some embodiments, a number of acoustic models and an acoustic model can be stored in the server 200, and the acoustic models and the external acoustic model are accessible by the processor 130 for speech synthesis and a training of a new acoustic model.

It is to be understood that "electrically coupled" or "communicatively coupled" mentioned above may refer to physical or non-physical coupling. For example, in some embodiments, the processor 130 can be coupled to the storage unit 120 by physical lines. In some other embodiments, the processor 130 can be coupled to the interface 110 by wireless communication standard. However, the coupling manners in the present disclosure are not limited thereto. Through the coupling manners described above, the processor 130, the storage unit 120, and the interface 110 can implement one-way messaging or two-way messaging.

Figure 2:
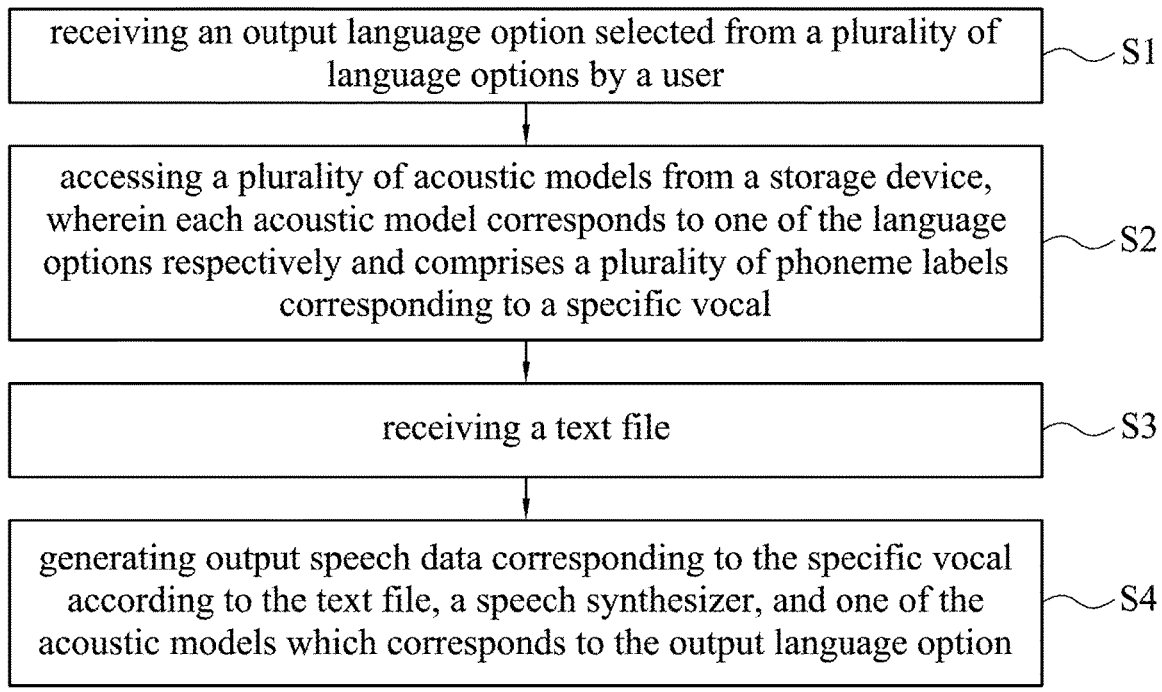
FIG. 2 is a flowchart illustrating a speech synthesis method, in accordance with some embodiments of the present disclosure.

FIG. 2 is a flowchart illustrating the speech synthesis method, in accordance with some embodiments of the present disclosure. As shown in FIG. 2, in some embodiments, the speech synthesis method may be performed by the speech synthesis system 100 shown in FIG. 1. In detail, the processor 130 accesses the computer executable instruction mentioned above from the storage unit 120, and implements the speech synthesis method by executing the specific application process, and communicate with the user through the interface 110. In some embodiments, detail steps of the speech synthesis method will be described in the following paragraphs.

Step S1: receiving an output language option selected from a number of language options by a user.

In some embodiments, the processor 130 can provide a number of language options through the operating interface 112 in the interface 110, which includes, for example, Chinese, English, Japanese, French, German, etc. The user of the speech synthesis system 100 can select a first language option and a second language option from the language options displayed on the interface 110. In some embodiments, the first language option is the input language option, and the second language option is the output language option.

It is to be understood that the speech synthesis system 100 in the present disclosure is a speech synthesis system with language converting function. The input language option is a language type corresponding to the speech that the user wants to input into the speech synthesis system 100. The output language option is a language type corresponding to the outputted speech that the user wants to have after the input language option is converted by the speech synthesis system 100. In some embodiments, the first language option is Chinese and the second language option is English.

Step S2: accessing a number of acoustic models from a storage unit, in which each acoustic model corresponds to one of the language options, and each acoustic model includes a number of phoneme labels corresponding to a specific vocal.

To be noticed, the storage unit 120 (or storage unit of server 200) can store a number of acoustic models, and the processor 130 can access the acoustic models. It is to be understood that all the acoustic models correspond to specific vocals. Alternatively stated, the acoustic models with different types of languages have specific timbre and pitch. In some embodiments, the specific vocal is the user voice of the speech synthesis system 100, and each acoustic model corresponds to a different language option in the language options mentioned above. For example, when the language options include Chinese, English, Japanese, French, and German, the acoustic models may include Chinese acoustic model, English acoustic model, Japanese acoustic model, French acoustic model, and German acoustic model.

In some embodiments, the acoustic models at least include a first acoustic model and a second acoustic model, but the present disclosure is not limited to the embodiments described above. The first acoustic model corresponds to the first language option described above, and includes a number of first phoneme labels corresponding to the first language option. The second acoustic model corresponds to the first language option described above, and includes a number of second phoneme labels corresponding to the second language option.

Step S3: receiving a text file.

In some embodiments, the processor 130 can receive an existing text file, which may be generated by many different ways. The text file can be an English text file for example, corresponding to the second language option.

Step S4: generating output speech data corresponding to the specific vocal according to the text file, a speech synthesizer, and one of the acoustic models corresponding to the output language option.

In some embodiments, the processor 130 can access the second acoustic model (corresponding to English), and generate the output speech data (e.g. an English speech file) to correspond to the content of the text file, by executing the speech synthesizer to apply the second acoustic model (e.g. the English acoustic model) according to the text file. To be noticed, the speech data outputted by applying the second acoustic model by the speech synthesizer is corresponding to the user's voice. That is, the speech synthesis system 100 can accomplish the converting function of outputting the English sentences with correct meaning by converting the Chinese sentences which are inputted by the user's voice.

The way to establish the second acoustic model corresponding to the second language option of a specific vocal after having the first acoustic model corresponding to the first language option will be further described in the following paragraphs. In some embodiments, the processor 130 can access (e.g., from a storage unit of the server 200) the external acoustic model, in which the external acoustic model corresponds to at least one of the language options (e.g., the second language option) and corresponds to the external vocal. The external acoustic model includes a number of external phoneme labels corresponding to the external vocal. It is to be understood that the external vocal is different from the user voice in the speech synthesis system 100, and it is usually the acoustic model commercially available or completely constructed by others, corresponding to the second language option.

It is to be understood that the phoneme mentioned above, which can also be called as phone in some embodiments, which represents the minimum unit that can be distinguished in human languages (including all types of languages). In the human languages, each single word, each phrase, each multiple-words group, and each single sentence can be a combination of multiple syllables, and each syllable is combined with one or more phonemes. In other words, each single word, each phrase, each multiple-words group, and each single sentence in human language can be understood as permutaions or combinations of different phonemes.

In some embodiments, a number of training corpuses corresponding to the first language option (e.g., Chinese) can further be stored into the storage unit 120. For example, the user can operate the speech receiving interface 111 of the interface 110, and record the training corpuses according to a corpus template (e.g., a template including specific pronunciation and specific sentence pattern). In some embodiments, the training corpuses can be configured to train the first acoustic model.

Figure 3:
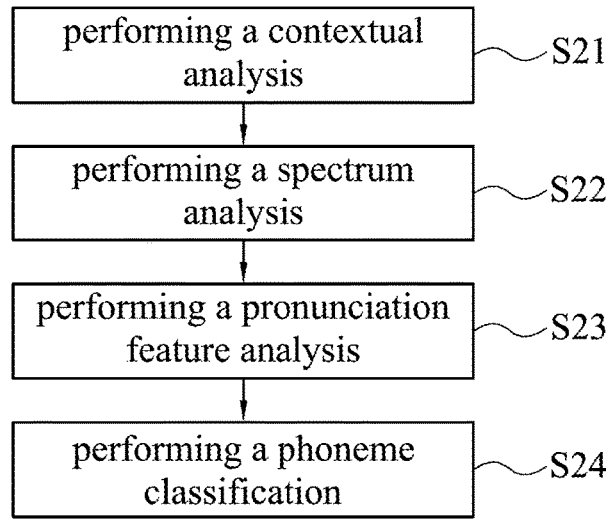
FIG. 3 is a flowchart illustrating the training method of a acoustic model, in accordance with some embodiments of the present disclosure.

In some embodiments, before establishing the second acoustic model or the acoustic models in other languages, the training of the acoustic models is required to be performed. The acoustic models acoustic model can be implemented through the following steps, with reference to FIG. 3. FIG. 3 is a flowchart illustrating the training method of the acoustic model, in accordance with some embodiments of the present disclosure.

Step S21: performing contextual analysis.

In some embodiments, the processor 130 can perform the contextual analysis on the training corpuses by the contextual analyzer. For example, the contextual analyzer can calculate a number of position values for each phoneme, wherein each of the position values is calculated according to a relative position of each phoneme within each single word, each phrase, each multiple-words group, and each single sentence of the specific phoneme in the training corpuses. For example but not limited to the position of the phoneme counted from the first letter of the present word, the position of the phoneme counted from the last letter of the present word, the position of the phoneme in the multiple-words group, the letters in the word where the phoneme is located, the phoneme the letters in one word before where the phoneme is located, etc. After the processor 130 performs the contextual analysis on the training corpuses by the contextual analyzer, the position values for each phoneme can be obtained.

Step S22: performing spectrum analysis.

In some embodiments, the processor 130 can perform spectrum analysis on the training corpuses by the spectrum analyzer, and can calculate a number of spectrum parameters for each phoneme according to a number of frequency coefficient definitions. For example, in conventional spectrum analysis, the processor 130 can decompose the training corpuses, by mel-frequency cepstral coefficients (MFCC), into a number of frames which are performed with a fourier transform through a high-pass filter, to obtain the spectrum of each frame. The processor 130 can obtain a mel scale of each frame by a mel filter, extract the logarithm of each mel scale, and perform the discrete and inverse fourier transform to the results to convert the results into a cepstrum domain, to obtain the mel frequency cepstrum coefficients. The mel frequency cepstrum coefficients can also be understood as a spectrum parameter of each phoneme in the training corpuses.

Step S23: performing pronunciation feature analysis.

In some embodiments, the processor 130 can perform the pronunciation feature analysis to the training corpuses by a pronunciation feature analyzer. For example, the processor 130 can use the position values and the spectrum parameters of each phoneme as input values of recurrent neural networks (RNN), and get the pronunciation feature values of each phoneme as the final output values.

In some embodiments, the pronunciation feature value of each phoneme generated by the training corpuses are collected by the processor 130, and the pronunciation feature values can be configured to establish the first acoustic model corresponding to the first language option (e.g. Chinese).

Step S24: performing phoneme classification.

In some embodiments, the processor 130 can compare the pronunciation feature value of the phoneme in the first acoustic model with the pronunciation feature value of the phoneme in other established models (e.g. external acoustic model) by the phoneme classifier, and determine if the pronunciation feature value of the phoneme in the first acoustic model are similar with the pronunciation feature value of the phoneme in the existing models. If the processor 130 determines that similarity of the phoneme in the first acoustic model and the pronunciation feature value of the phoneme in the existing models is more than a threshold value (e.g., 80%), then the processor 130 can classify the two phonemes into a same group, to establish a mapping relationship between the two phonemes in different models.

Through the mapping relationship, the processor 130 can establish a second acoustic model corresponding to the second language option with the user's voice. It is to be understood that if the pronunciation feature value of a phoneme in the first acoustic model (corresponding to Chinese) is similar with the pronunciation feature value of a phoneme in the external acoustic model (corresponding to English), then the relationship of the two phonemes can be configured to combine another acoustic model (e.g. the second acoustic model, corresponding to English). In this acoustic model, the similar phoneme in the external acoustic model can be substituted by the phoneme in the first acoustic mode, but the words and the sentence rhythms (i.e., the words and sentences in English) of the external acoustic model are reserved. Accordingly, the output speech data generated by the second acoustic model and the speech synthesizer has user's timbre, tone, and rhythm, just like having an version of another language (such as English) spoken by the user with his voice.

In other words, the contextual analysis, the spectrum analysis, the pronunciation feature analysis and the phoneme classification performed by the processor 130 through steps S21-S24, can be utilized to generate the pronunciation feature value of each phoneme by the training corpuses of the specific language recorded by the user's voice. Besides, an acoustic model in another language which seems to be spoken by the user's voice can be built by comparing the pronunciation feature value with a pronunciation feature value in an existing model with the another language.

Figure 4:
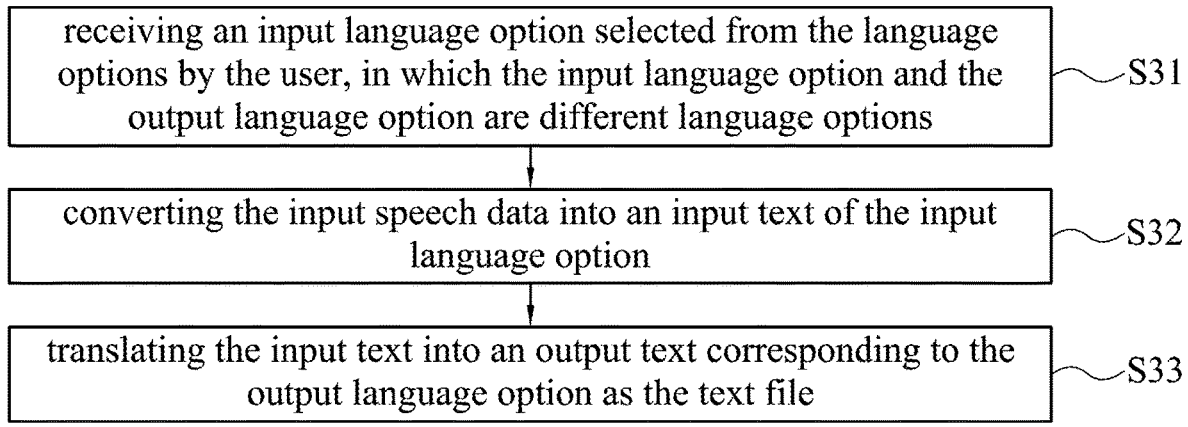
FIG. 4 is a flowchart illustrating the method of text generating, in accordance with some embodiments of the present disclosure.

In some other embodiments, the conversion way of the text file received by the processor 130 in the step S3 described above is illustrated as follows. Reference is also made to FIG. 4.

Step S31: receiving an input language option selected from the language options by the user, in which the input language option and the output language option are different language options.

In some embodiments, when the user of the speech synthesis system 100 speak in a language corresponding to the first language option (e.g. Chinese), the input speech data corresponding to the first language option (e.g. Chinese) can be received by the speech receiving interface 111 in the operation interface 110. For example, when the user said "the house is on fire", the speech receiving interface 111 can collect and record the input speech data corresponding to the content of "the house is on fire".

Step S32: converting the input speech data into an input text of the input language option.

In some embodiments, the processor 130 can convert the input speech data into the input text corresponding to the input language option by a speech-to-text (STT) converter. For example, the input speech data recorded by the speech receiving interface 111 corresponding to the speech content of "the house is on fire" can be obtained as an input text content by the processor 130 through a speech-to-text process.

Step S33: translating the input text into an output text corresponding to the output language option as the text file.

In some embodiments, the processor 130 can translate the input text content into the output text corresponding to the second language option (e.g. English) as a text file by the translator. For example, the processor 130 can translate the input text content of "The house is on fire" in English into the same input text content in Chinese as the output text content. The translator can be a translating machine, a translating software/system which are publicly available.

In some embodiments, the processor 130 can use the text content outputted by the steps S31-S33 as the text file.

The text file corresponding to the second language option can be used to generate output speech data corresponding to the specific vocal by the speech synthesizer through the step S4 of obtaining the second acoustic model corresponding to the second language option.

As described in the above embodiments, the processor 130 can access the second acoustic model (corresponding to English), and execute the speech synthesizer to apply the second acoustic model to output the content of the text file (e.g. the house is on fire). To be noticed, the speech data outputted by the speech synthesizer with the second acoustic model corresponds to the user's voice. That is, the speech synthesis system 100 can accomplish the converting function of outputting the English sentences with correct meaning by converting the Chinese sentences which inputted by the user's voice. Basically, when applying the speech synthesis system 100 in the present disclosure, the voice actors can record a corpus in only one type of language, and the speech synthesis system 100 can output the speech in other different types of languages converted by the voice of the voice actor accordingly.

It is to be understood that in the embodiments described above, the speech synthesis system 100 in present disclosure has multiple function blocks or modules. People skilled in the art should understand that, in some embodiments, preferably, the multiple function blocks or modules can be implemented by specific circuit (including a dedicated circuit or a general circuit operated under one or more processors and code instruction). In general, the specific circuit may include transistors or other circuit components, and with the configuration of the embodiments mentioned above, the specific circuit can be operated according to the function and the operation described in the present disclosure. In further, the cooperation process between the function blocks or the modules in the specific circuit can be implemented by specific compiler, for example, a register transfer language (RTL) compiler. However, the present disclosure is not limited thereto.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A speech synthesis system comprising:
an operating interface configured to provide a plurality of language options for a user to select one language option therefrom as an output language option;
a storage unit configured to store a plurality of acoustic models and an external acoustic model corresponding to the language options and an external vocal, wherein each of the plurality of acoustic models corresponds to one of the plurality of language options and includes a plurality of phoneme labels corresponding to a specific vocal, and the external acoustic model comprises a plurality of external phoneme labels corresponding to the external vocal; and
a processor communicatively coupled to the operating interface and the storage unit, wherein the processor is configured to perform operations comprising:
receiving a text file, and generating output speech data corresponding to the specific vocal according to the text file, a speech synthesizer, and one of the plurality of acoustic models which corresponds to the output language option;

wherein the acoustic models at least comprise a first acoustic model and a second acoustic model, wherein the first acoustic model corresponds to a first language option and comprises a plurality of first phoneme labels corresponding to the first acoustic model, and the second acoustic model corresponds to a second language option and comprises a plurality of second phoneme labels corresponding to the second acoustic model, and the plurality of second phoneme labels corresponding to the second acoustic model are generated from the plurality of first phoneme labels corresponding to the first acoustic model and the plurality of external phoneme labels corresponding to the external acoustic model.

2. The speech synthesis system of claim 1, wherein the operating interface is further configured for the user to select one of the plurality of language options as an input language option, and the input language option and the output language option correspond to different languages, wherein the speech synthesis system further comprises:

a speech receiving interface configured to receive input speech data corresponding to the input language option;

wherein the processor is further configured to convert, by a converter, the input speech data into an input text corresponding to the input language option, and the processor is further configured to translate, by a translator, the input text into an output text corresponding to the output language option as the text file.

3. The speech synthesis system of claim 1, wherein the storage unit is further configured to store a plurality of training corpuses corresponding to the first acoustic model, and to generate the plurality of first phoneme labels corresponding to the first acoustic model, the processor is further configured to perform operations comprising:

performing a contextual analysis, a spectrum analysis, and a pronunciation feature analysis to the plurality of training corpuses corresponding to the first acoustic model, to generate the plurality of first phoneme labels of the first acoustic model;

searching a matching phoneme label from the plurality of external phoneme labels corresponding to the external acoustic model for each of the plurality of first phoneme labels of the first acoustic model; and establishing a mapping relationship between each of the plurality of first phoneme labels of the first acoustic model and the matching phoneme label from the plurality of external phoneme labels of the external acoustic model.

4. The speech synthesis system of claim 3, wherein to perform the contextual analysis, the processor is further configured to calculate a plurality of position values for each phoneme, wherein each of the plurality of position values is calculated according to a relative position of each phoneme within a single word, a phrase, a multiple-words group, and a single sentence of the plurality of training corpuses.

5. The speech synthesis system of claim 4, wherein to perform the spectrum analysis, the processor is further configured to calculate a plurality of spectrum parameters for each phoneme according to a plurality of frequency coefficient definitions.

6. The speech synthesis system of claim 5, wherein to perform the pronunciation feature analysis, the processor is further configured to calculate a plurality of pronunciation feature values of each phoneme according to the plurality of position values and the plurality of spectrum parameters.

7. The speech synthesis system of claim 6, wherein the processor is further configured to classify, by a phoneme classifier, the pronunciation features of the values corresponding to each phoneme of the first acoustic model and the pronunciation features of the values corresponding to each phoneme of the external acoustic model, to cluster similar pronunciation features of the pronunciation features into a same group, to establish the mapping relationship.

8. The speech synthesis system of claim 1, wherein the operating interface is further configured to provide one of the language options for the user to select as an input language option, and the input language option and the output language option are different languages, and the speech synthesis system further comprises:

a speech receiving interface configured to receive an image file, wherein the image file comprises image speech data corresponding to the input language option and subtitle data corresponding to the output language option, wherein the processor is further configured to use the subtitle data as the text file, and substitute the speech data with the output speech data.

9. A speech synthesis method comprising:

receiving an output language option selected from a plurality of language options by a user;

accessing a plurality of acoustic models and an external acoustic model corresponding to the plurality of language options and an external vocal from a storage unit, wherein each acoustic model corresponds to one of the plurality of language options respectively and comprises a plurality of phoneme labels corresponding to a specific vocal, and the external acoustic model comprises a plurality of external phoneme labels corresponding to the external acoustic model;

receiving a text file; and generating output speech data corresponding to the specific vocal according to the text file, a speech synthesizer, and one of the plurality of acoustic models which corresponds to the output language option;

wherein the plurality of acoustic models at least comprise a first acoustic model and a second acoustic model, wherein the first acoustic model corresponds to a first language option and comprises a plurality of first phoneme labels corresponding to the first acoustic model, and the second acoustic model corresponds to a second language option and comprises a plurality of second phoneme labels corresponding to the first acoustic model; and the plurality of second phoneme labels corresponding to the second acoustic model are generated from the plurality of first phoneme labels corresponding to the first acoustic model and the plurality of external phoneme labels corresponding to the external acoustic model.

10. The speech synthesis method of claim 9, further comprises:

receiving an input language option selected from the plurality of language options by the user, wherein the input language option and the output language option are different languages;

receiving input speech data corresponding to the input language option;

converting the input speech data into an input text corresponding to the input language option; and translating the input text into an output text corresponding to the output language option as the text file.

11. The speech synthesis method of claim 9, wherein the storage unit is further configured to store a plurality of training corpuses, and to generate the plurality of first phoneme labels corresponding to the first acoustic model, a processor is further configured to perform operations comprising:

performing a contextual analysis, a spectrum analysis, and a pronunciation feature analysis to the plurality of training corpuses corresponding to the first acoustic model, to generate the first plurality of phoneme labels of the first acoustic model;

searching a matching phoneme label from the plurality of external phoneme labels corresponding to the external acoustic model for each of the plurality of first phoneme labels of the first acoustic model; and establishing a mapping relationship between each of the plurality of first phoneme labels of the first acoustic model and matching phoneme label from the plurality of external phoneme labels of the external acoustic model.

12. The speech synthesis method of claim 11, wherein to perform the contextual analysis, the processor is further configured to calculate a plurality of position values for each phoneme, wherein each of the plurality of position values is calculated according to a relative position of each phoneme within a single word, a phrase, a multiple-words group, and a single sentence of the plurality of training corpuses.

13. The speech synthesis method of claim 12, wherein to perform the spectrum analysis, the processor is further configured to calculate a plurality of spectrum parameters for each phoneme according to a plurality of frequency coefficient definitions.

14. The speech synthesis method of claim 13, wherein to perform the pronunciation feature analysis, the processor is further configured to calculate a plurality of pronunciation feature values of each phoneme according to the plurality of position values and the plurality of spectrum parameters.

15. The speech synthesis method of claim 14, wherein the processor is further configured to classify, by a phoneme classifier, the pronunciation features of the values corresponding to each phoneme of the first acoustic model and the pronunciation features of the values corresponding to each phoneme of the external acoustic model, to cluster similar pronunciation features of the pronunciation features into a same group, to establish the mapping relationship.

16. The speech synthesis method of claim 9, further comprises:

receiving an input language option selected from the plurality of language options by the user, wherein the input language option and the output language option are different languages;

receiving an image file, wherein the image file comprises image speech data corresponding to the input language option and subtitle data corresponding to the output language option; and using the subtitle data as the text file, and substitute the speech data with the output speech data.

17. A non-transitory computer readable medium comprises at least one computer executable instruction which, when executed by a processor, causes the processor to:

receive an output language option selected from a plurality of language options by a user;

access a plurality of acoustic models and an external acoustic model corresponding to the plurality of language options and an external vocal from a storage unit, wherein each acoustic model corresponds to one of the plurality of language options respectively and comprises a plurality of phoneme labels corresponding to a specific vocal, and the external acoustic model comprises a plurality of external phoneme labels corresponding to the external acoustic model;

receive a text file; and generate output speech data corresponding to the specific vocal according to the text file, a speech synthesizer, and one of the plurality of acoustic models which corresponds to the output language;

wherein the plurality of acoustic models at least comprise a first acoustic model and a second acoustic model, wherein the first acoustic model corresponds to a first language option and comprises a plurality of first phoneme labels corresponding to the first acoustic model, and the second acoustic model corresponds to a second language option and comprises a plurality of second phoneme labels corresponding to the first acoustic model; and the plurality of second phoneme labels corresponding to the second acoustic model are generated from the plurality of first phoneme labels corresponding to the first acoustic model and the plurality of external phoneme labels corresponding to the external acoustic model.

* * * * *